(12) United States Patent
Shim et al.

(10) Patent No.: US 8,653,390 B2
(45) Date of Patent: Feb. 18, 2014

(54) ENGINE START/STOP SWITCH FOR A VEHICLE

(75) Inventors: Woo Young Shim, Gwangju (KR); Dong Ju Yang, Gwangju (KR)

(73) Assignee: ALPS Electric Korea Co., Ltd., Gwangju (KR)

( * ) Notice: Subject to any disclaimer, the term of this patent is extended or adjusted under 35 U.S.C. 154(b) by 82 days.

(21) Appl. No.: 13/501,379

(22) PCT Filed: Oct. 14, 2010

(86) PCT No.: PCT/KR2010/007043
§ 371 (c)(1),
(2), (4) Date: Apr. 11, 2012

(87) PCT Pub. No.: WO2011/052916
PCT Pub. Date: May 5, 2011

(65) Prior Publication Data
US 2012/0199461 A1  Aug. 9, 2012

(30) Foreign Application Priority Data
Oct. 28, 2009  (KR) .................... 20-2009-0014034 U

(51) Int. Cl.
*H01H 3/12*  (2006.01)

(52) U.S. Cl.
USPC ........................................ 200/341; 123/179.2

(58) Field of Classification Search
USPC .............. 200/341; 307/10.1, 10.5, 10.6; 123/179.2, 198 DC; 290/38 C, 38 R; 340/5.62
See application file for complete search history.

(56) References Cited

U.S. PATENT DOCUMENTS 8,263,885 B2 * 9/2012 Yamamoto ................ 200/302.1
2007/0241862 A1 * 10/2007 Dimig et al. ................ 340/5.62

FOREIGN PATENT DOCUMENTS

| JP | 2009-047173 A | 3/2009 |
| JP | 2009-121279 A | 6/2009 |
| KR | 10-2004-0090478 A | 10/2004 |
| KR | 10-0785845 B1 | 12/2007 |
| KR | 10-2009-0046121 A | 5/2009 |

OTHER PUBLICATIONS

International Search Report for International Application No. PCT/KR2010/007043.

* cited by examiner

*Primary Examiner* — Vanessa Girardi
(74) *Attorney, Agent, or Firm* — LRK Patent Law Firm

(57) ABSTRACT

An engine start/stop switch for a vehicle is provided, including a housing having one end portion exposed outwardly from a dashboard and the other end portion embedded in the dashboard; a button disposed in the housing and having one end portion exposed outwardly to be pressed to start or stop an engine; a slider disposed at the front end of the button to be slid along the inner peripheral surface of the housing; a circuit unit disposed to closely contact the front end of the slider to be electrified when pressed by the slider and to generate an engine start or stop signal; and a coil antenna interposed between the button and the slider to transmit driving waves to the transponder of a portable device carried by a driver. Further, the housing includes first and second housings detachably coupled to each other to encompass the button, slider and circuit unit.

5 Claims, 4 Drawing Sheets

ENGINE START/STOP SWITCH FOR A VEHICLE

CROSS REFERENCE TO RELATED APPLICATION

This application is a National Stage of International Application No. PCT/KR2010/007043 filed Oct. 14, 2010, claiming priority based on Korean Patent Application No. 20-2009-0014034 filed Oct. 28, 2009, the content of which is incorporated herein by reference in its entirety.

TECHNICAL FIELD

The present invention relates to an engine start/stop switch for a vehicle, and more particularly, to an engine start/stop switch for a vehicle that has a coil antenna disposed in the vicinity of a button adapted to ignite an ignition plug, so as to generate an electromotive force from a portable device even when the voltage of the battery of the portable device drops and thus to transmit an ID (Identification) code to an ECU (Electronic Control Unit) of the vehicle, so that a portable device holder can be eliminated in the vehicle, thereby reducing manufacturing costs and manufacturing processes and enabling the space in the vehicle from which the portable device holder is removed to be utilized for various purposes.

BACKGROUND ART

Generally, there are many types of vehicle keys, such as a plate-shaped basic key inserted directly into a key box by a user to start an engine, a remote control key having the functions of opening/closing the doors of the vehicle and starting an engine from a remote distance embedded therein, and a smart key capable of releasing a door locking state if a driver approaches the vehicle in a state of being carried with him and starting an engine by means of pressing a button after he gets in the vehicle.

Further, there has been recently suggested a portable device that transmits an ID code signal inclusive of an ID code so as to conduct vehicle immobilization.

If a user gets in the vehicle with such portable device carried by him, the ID code signal of the portable device is automatically transmitted to an ECU of the vehicle to check whether the ID code of the portable device corresponds with a previously set ID code in the ECU. If it corresponds therewith, an ignition switch (button) is pressed to activate a start motor, thereby making the engine of the vehicle started.

By the way, if the ID code signal is not automatically transmitted to the ECU of the vehicle because of the voltage drop of the battery of the portable device, the portable device is inserted into a portable device holder mounted in the vehicle, so that a coil antenna (immobilizer coil) mounted in the portable device holder transmits driving waves to a transponder in the portable device and thus generates an electromotive force capable of transmitting the ID code signal to the ECU of the vehicle again, thereby making the engine started.

In the above-mentioned conventional practices, however, the portable device holder for mounting the coil antenna from which driving waves are transmitted to the portable device to generate the electromotive force from the portable device should be mounted in the interior of the vehicle, thereby undesirably increasing manufacturing costs and manufacturing processes for the portable device holder and making the space in the vehicle in which components having other functions are provided reduced because of the space occupied by the portable device holder.

DISCLOSURE

Technical Problem

Accordingly, the present invention has been made in view of the above-mentioned problems occurring in the prior art, and it is an object of the present invention to provide an engine start/stop switch for a vehicle that has a coil antenna disposed in the vicinity of the button adapted to ignite an ignition plug, so as to generate an electromotive force from a portable device even when the voltage of the battery of the portable device drops and thus to transmit an ID code to an ECU of the vehicle, so that a portable device holder can be eliminated in the vehicle, thereby reducing manufacturing costs and manufacturing processes and enabling the space in the vehicle from which the portable device holder is removed to be utilized for various purposes.

Technical Solution

To accomplish the above object, according to the present invention, there is provided an engine start/stop switch for a vehicle, including: a housing having one end portion exposed outwardly from a dashboard and the other end portion embedded in the dashboard; a button disposed in the housing and having one end portion exposed outwardly in such a manner as to be pressed to start or stop an engine; a slider disposed at the front end of the button in such a manner as to be slid along the inner peripheral surface of the housing; a circuit unit disposed to closely contact the front end of the slider in such a manner as to be electrified when pressed by the slider and to generate an engine start or stop signal; and a coil antenna interposed between the button and the slider to transmit driving waves to the transponder of a portable device carried by a driver.

According to the present invention, desirably, the housing includes first and second housings detachably coupled to each other in such a manner as to encompass the button, the slider and the circuit unit.

According to the present invention, desirably, the second housing has a stopper disposed on the upper end portion thereof so as to stop lock the pressurization of the slider at a given position, and the slider has a locking portion locked to the stopper of the second housing.

According to the present invention, desirably, the button has a unitary structure detachably coupled to the slider, while encompassing the coil antenna.

According to the present invention, desirably, the slider has a structure wherein double circular pipes having large and smaller diameters are spaced apart from each other by a given distance and connected to the upper and lower end portions thereof by means of a connection rib so as to allow a harness to be piercedly disposed thereinto.

According to the present invention, desirably, the circuit unit includes a printed circuit board and an elastic plate disposed on the top of the printed circuit board and having contact protrusions elastically pressed and released from the pressed state through the pressing of the button, thereby being electrified with the printed circuit board to generate the engine start or stop signal.

According to the present invention, desirably, the coil antenna has a circular pipe structure seated on the top end portion of the slider and closely contacted with the inner peripheral surface of the button.

Advantageous Effect

According to the present invention, the engine start/stop switch for a vehicle has the coil antenna disposed in the vicinity of the button adapted to ignite an ignition plug, so as to generate an electromotive force from a portable device even when the voltage of the battery of the portable device drops and thus to transmit an ID code to an ECU of the vehicle, so that a portable device holder can be eliminated in the vehicle, thereby reducing manufacturing costs and manufacturing processes and enabling the space in the vehicle from which the portable device holder is removed to be utilized for various purposes.

BEST MODE FOR INVENTION

Hereinafter, an explanation on an engine start/stop switch for a vehicle according to the present invention will be given with reference to the attached drawings.

Figure 1:
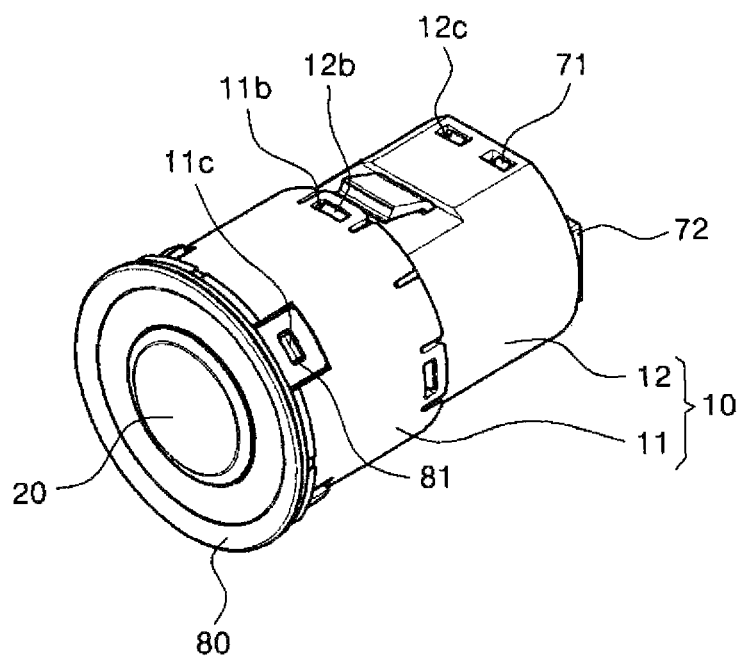
FIG. 1 is a perspective view showing an engine start/stop switch for a vehicle according to the present invention.
Figure 2:
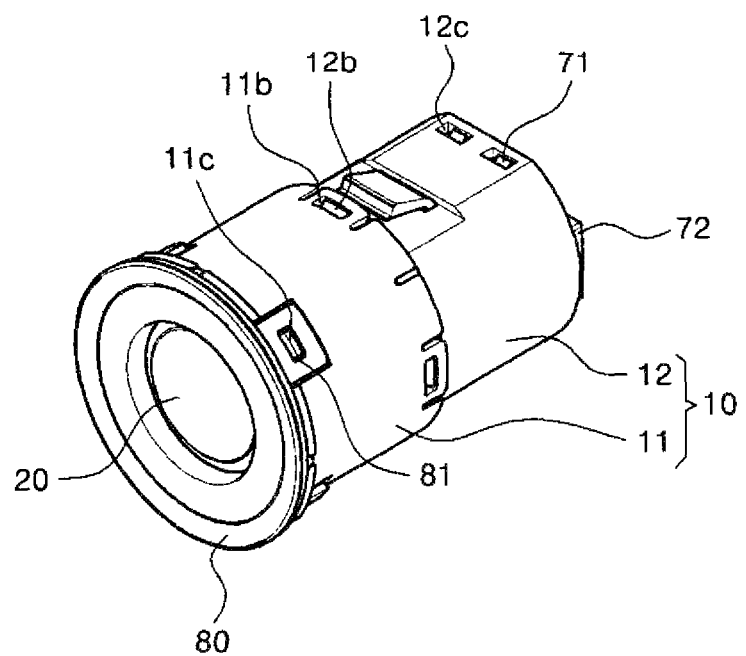
FIG. 2 is a perspective view showing the state where a button in the engine start/stop switch is pressed.
Figure 3:
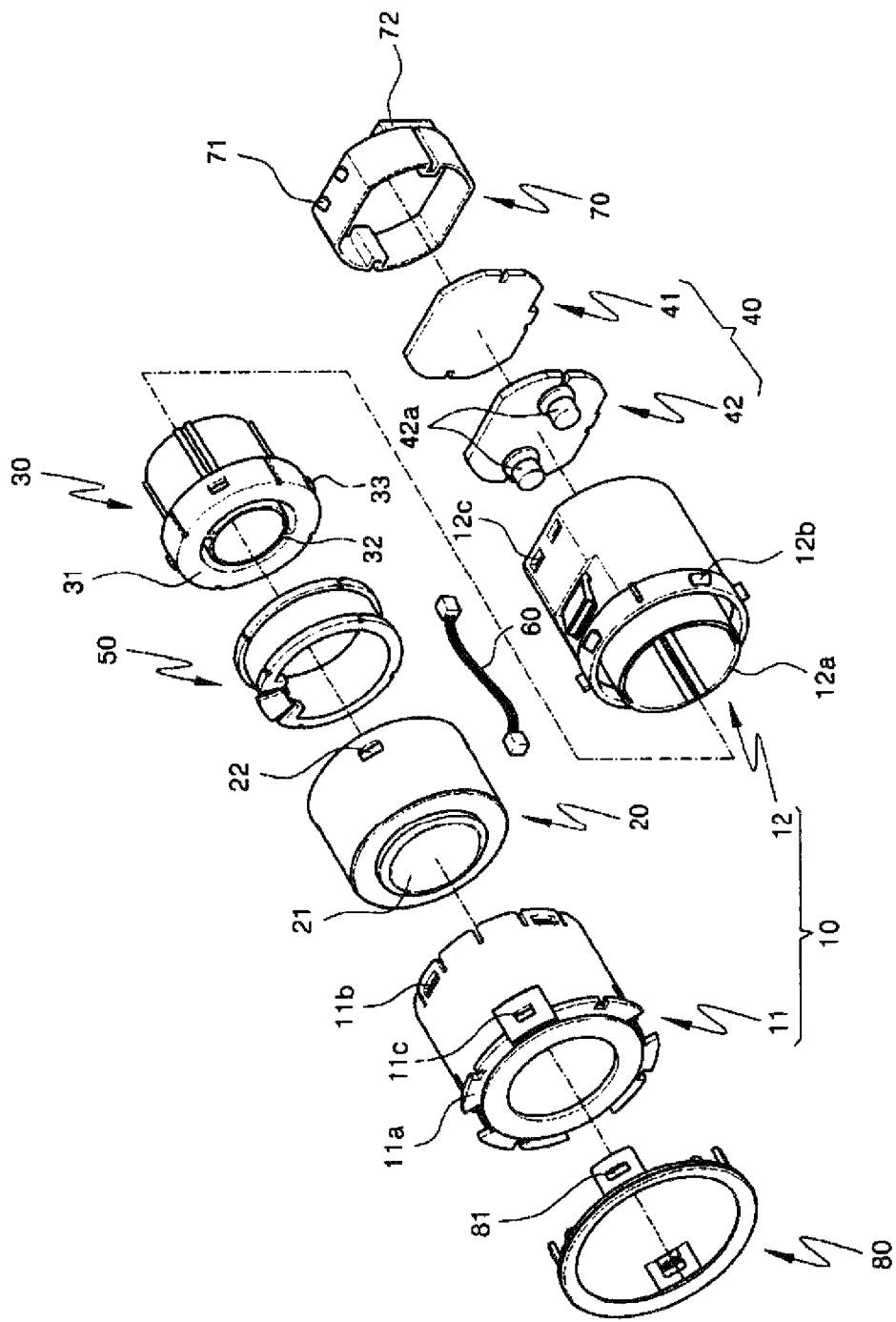
FIG. 3 is an exploded perspective view showing the engine start/stop switch for a vehicle according to the present invention.
Figure 4:
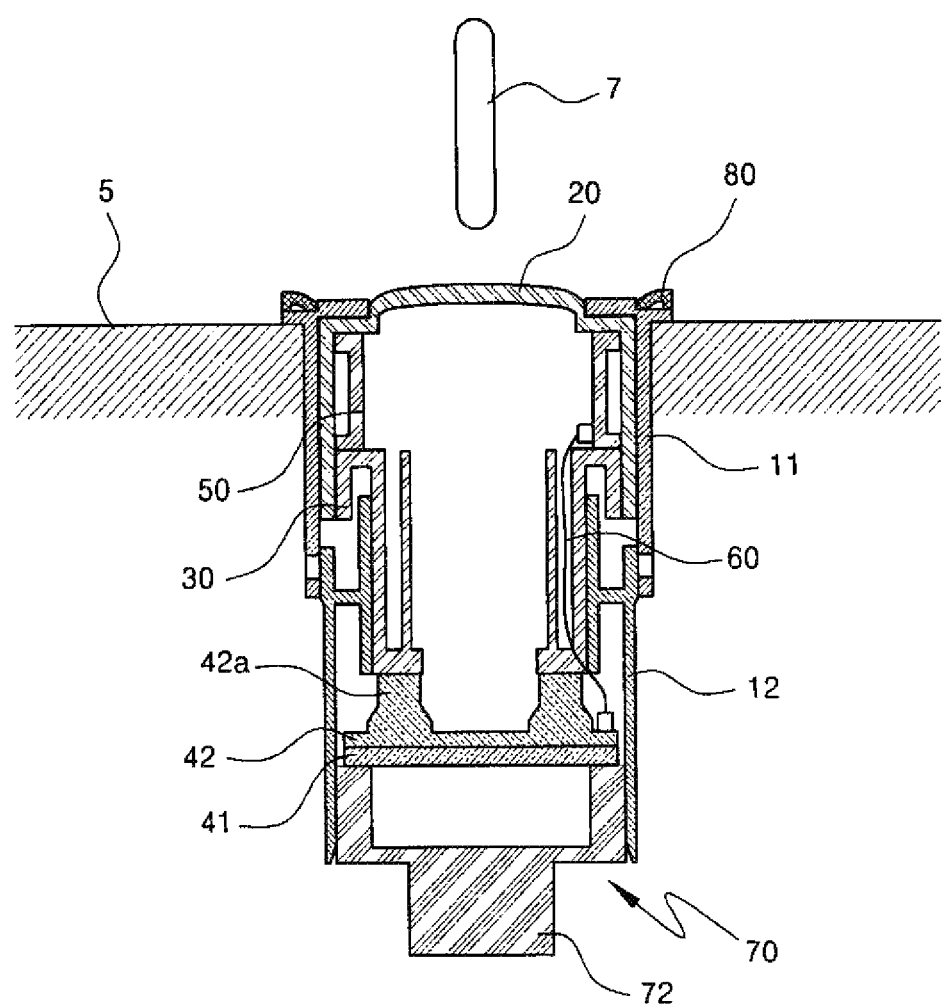
FIG. 4 is a sectional view showing the engine start/stop switch for a vehicle according to the present invention.
Figure 5:
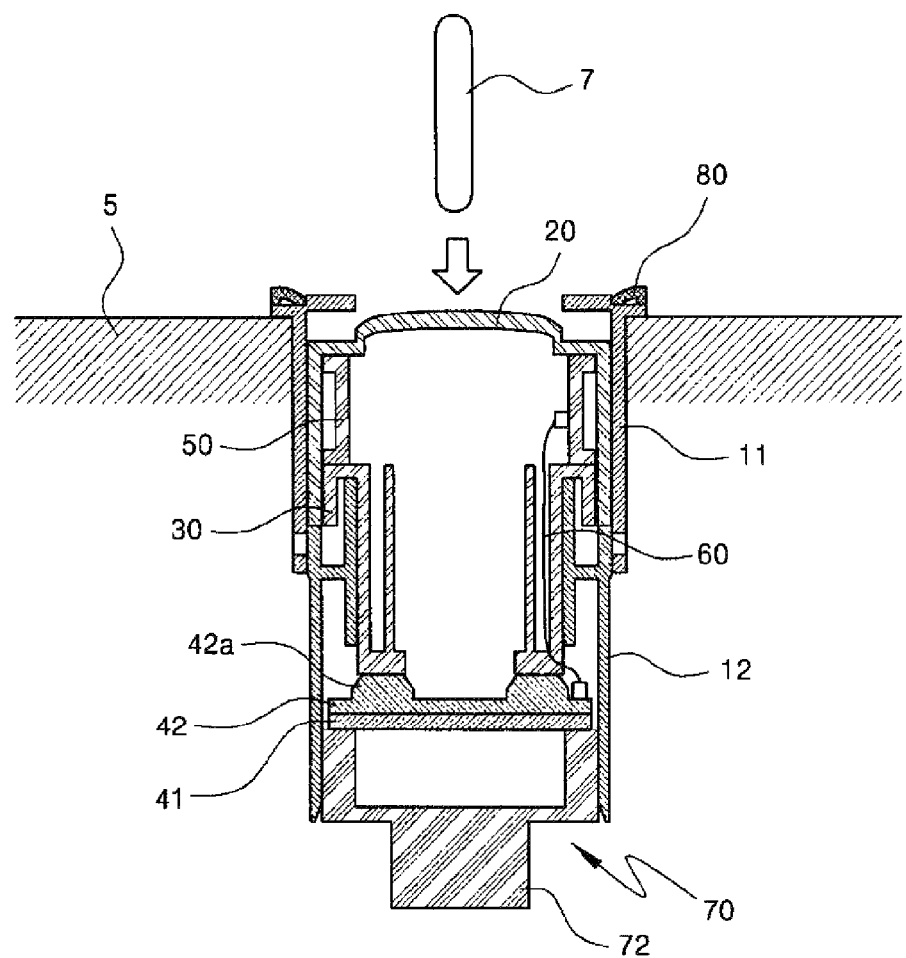
FIG. 5 is a sectional view showing the state where a button in the engine start/stop switch is pressed.

As shown in FIGS. 1 to 5, an engine start/stop switch for a vehicle according to the present invention includes: a housing 10 having one end portion exposed outwardly from a dashboard 5 and the other end portion embedded in the dashboard 5; a button 20 disposed in the housing 10 and having one end portion exposed outwardly in such a manner as to be pressed to start or stop an engine; a slider 30 disposed at the front end of the button 20 in such a manner as to be slid along the inner peripheral surface of the housing 10; a circuit unit 40 disposed to closely contact the front end of the slider 30 in such a manner as to be electrified when pressed by the slider 30 and to generate an engine start or stop signal; and a coil antenna 50 interposed between the button 20 and the slider 30 to transmit driving waves to the transponder of a portable device 7 carried by a driver.

The housing 10 includes first and second housings 11 and 12 having a circular pipe structure detachably coupled to each other in upward and downward directions in such a manner as to encompass the button 20, the slider 30 and the circuit unit 40.

That is, the first housing 11 has one end portion exposed outwardly from the dashboard 5 and the other end portion adapted to encompass portions of the upper ends of the button 20 and the slider 30, and the second housing 12 is adapted to encompass the circuit unit 40 disposed on the lower side thereof and a portion of the lower end of the slider 30.

In the structures of the first housing 11 and the second housing 12, a reference numeral 11a denotes a plurality of locking projections exposed outwardly from the dashboard 5 in such a manner as to be locked to the dashboard 5, 11b denotes a plurality of coupling grooves, and 12b denotes a plurality of coupling protrusions lockedly coupled to the corresponding coupling grooves 11b.

Further, the second housing 12 has a stopper 12a of a circular pipe structure having a small diameter, which is disposed on the upper end portion thereof so as to lock a locking portion 31 of the slider 30 thereto and thus to allow the pressurization of the slider 30 to be stopped at a given position.

The button 20 has a unitary circular pipe structure encompassing the coil antenna 50 and includes a pressurizing portion 21 disposed on one end portion thereof in such a manner as to be closed for a pressing operation, while encompassing the outer peripheral surface of the slider 30 on the other end portion thereof in such a manner as to be detachably coupled to the slider 30.

A reference numeral 22 denotes a plurality of coupling grooves, and 33 denotes a plurality of coupling protrusions lockedly coupled to the corresponding coupling grooves 22.

The slider 30 has a structure wherein double circular pipes having large and smaller diameters are spaced apart from each other by a given distance and connected to the upper and lower end portions thereof by means of a connection rib 32 so as to alloy a harness 60 to be piercedly disposed thereinto, and the harness 60 connects the coil antenna 50 and the circuit unit 40 so as to transmit the input and output signal information from/to a printed circuit board 41 to a circuit terminal of the printed circuit board 41.

In this case, disposing the harness 60 between the double circular pipes enables the light of an LED (not shown) of the printed circuit board 41 to reach the button 20 in a vivid state, without having any interference of the harness 60.

Furthermore, the slider 30 has the locking portion 31 having a radially perpendicularly extended flange formed along the top end periphery of the outside circular pipe so as to be locked to the stopper 12a at the time of moving the slider 30 down and thus to prevent further descending thereof.

The circuit unit 40 includes the printed circuit board 41 having a shape of a plate and an elastic plate 42 disposed on the top of the printed circuit board 41 and having contact protrusions 42a elastically pressed and released from the pressed state through the pressing of the button 20, thereby being electrified with the printed circuit board 41 to generate an engine start or stop signal.

That is, the button 20 is pressed to electrify the printed circuit board 41, and after that, if the pressed force is released, the button 20 is returned to its original state by means of the elastic force of the elastic plate 42.

The coil antenna 50 has a circular pipe structure seated on the locking portion 31 of the top end portion of the slider 30 and closely contacted with the inner peripheral surface of the button 20.

A reference numeral 70 denotes a support cover insertedly coupled to the inner peripheral surface of the lower end portion of the second housing 12 so as to support the underside surface of the printed circuit board 41, and 80 denotes a protection ring adapted to cover the top end periphery, of the first housing 11 exposed outwardly from the dashboard 5.

The second housing 12 and the support cover 70, and the first housing 11 and the protection ring 80 are detachably coupled to each other by means of the coupling between the respective hooks 71 and 11c and the corresponding hook grooves 12c and 81.

A reference numeral 72 denotes a connection portion adapted to connect a connection pin (not shown) of the printed circuit board 41 and an object connector with each other.

Hereinafter, an explanation on the assembling process of the engine start/stop switch for a vehicle according to the present invention will be given. First, the coil antenna 50 is disposed on the surface of the locking portion 31 of the slider 30 and is encompassed by the button 20. Next, the button 20 is coupled to the slider 30.

After that, the underside surface of the slider 30 is brought into close contact with the circuit unit 40, and the printed circuit board 41 and the coil antenna 50 are connected by means of the harness 60. Next, the first and second housings 11 and 12 are provided to encompass the button 20, the slider 30 and the circuit unit 40, and the support cover 70 is coupled to the lower end portion of the second housing 12 to support the circuit unit 40.

Sequentially, the locking projections 11a of the first housing 11 are locked to the edge periphery of the through hole formed on the dashboard 5, and the top end periphery of the first housing 11 is covered with the protection ring 80, thereby finally completing the assembling procedure of the engine start/stop switch for a vehicle according to the present invention.

In this state, if a user gets in the vehicle with a portable device 7 carried by him, the ID code signal of the portable device 7 is automatically transmitted to the ECU of the vehicle, and it is determined whether the received ID code of the portable device 7 corresponds with a previously set ID code in the ECU. If it corresponds therewith, the button (ignition switch) 20 is pressed to activate a start motor, thereby making the engine of the vehicle started.

By the way, if the ID code signal is not automatically transmitted to the ECU of the vehicle because of the voltage drop of the battery of the portable device 7, the portable device 7 is moved near the button 20 (for example, is moved within the range of about 50 mm from the button 20), and next, if the button 20 is pressed by means of the portable device 7 grasped by the user's hand, the coil antenna (immobilizer coil) 50 disposed on the lower side of the button 20 transmits driving waves to a transponder (not shown) in the portable device 7 and thus generates an electromotive force capable of transmitting the ID code signal to the ECU of the vehicle again, thereby making the engine started.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

[Industrial Applicability]

The present invention is applicable to engine start/stop switches for a vehicle having a portable device provided to transmit an ID code signal.

Especially, it is advantageous in utilizing the space in the vehicle for various purposes because a portable device holder is eliminated in the vehicle.

The invention claimed is:

1. An engine start/stop switch for a vehicle, comprising:
a housing having one end portion exposed outwardly from a dashboard and another end portion embedded in the dashboard;
a button disposed in the housing and having one end portion exposed outwardly in such a manner as to be pressed to start or stop an engine;
a slider disposed at one end of the button and on an inner side of the housing in such a manner as to be slid along the housing;
a circuit unit disposed to closely contact one end of the slider in such a manner as to be electrified when pressed by the slider and to generate an engine start or stop signal; and
a coil antenna interposed between the button and the slider to transmit driving waves to a portable device carried by a driver,
wherein the housing comprises first and second housings detachably coupled to each other in such a manner as to encompass the button, the slider and the circuit unit, and
wherein the slider has a structure wherein double circular pipes having large and smaller diameters are spaced apart from each other by a given distance and connected to upper and lower end portions thereof by means of a connection rib so as to allow a harness to be piercedly disposed thereinto.

2. The engine start/stop switch for a vehicle according to claim 1, wherein the second housing has a stopper to stop pressurization of the slider, and the slider has a locking portion locked to the stopper of the second housing.

3. The engine start/stop switch for a vehicle according to claim 1, wherein the button has a unitary structure detachably coupled to the slider, while encompassing the coil antenna.

4. The engine start/stop switch for a vehicle according to claim 1, wherein the circuit unit comprises a printed circuit board and an elastic plate disposed on a top of the printed circuit board having contact protrusions elastically pressed and released from the pressed state through the pressing of the button, thereby being electrified with the printed circuit board to generate the engine start or stop signal.

5. The engine start/stop switch for a vehicle according to claim 1, wherein the coil antenna has a circular pipe structure seated on a top end portion of the slider and on an inner side of the button so as to be closely contacted with the button.

* * * * *